(12) United States Patent
Bhatia et al.

(10) Patent No.: US 9,213,730 B2
(45) Date of Patent: Dec. 15, 2015

(54) METHOD AND APPARATUS FOR EXTRACTING PORTIONS OF TEXT FROM LONG SOCIAL MEDIA DOCUMENTS

(71) Applicant: Xerox Corporation, Norwalk, CT (US)

(72) Inventors: Sumit Bhatia, Webster, NY (US); Saurabh Kataria, Webster, NY (US); Wei Peng, Fremont, CA (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 214 days.

(21) Appl. No.: 13/965,924

(22) Filed: Aug. 13, 2013

(65) Prior Publication Data

US 2015/0052120 A1    Feb. 19, 2015

(51) Int. Cl.
*G06F 17/30* (2006.01)
(52) U.S. Cl.
CPC ...... *G06F 17/30336* (2013.01); *G06F 17/3053* (2013.01)

(58) Field of Classification Search
CPC combination set(s) only.
See application file for complete search history.

(56) References Cited

U.S. PATENT DOCUMENTS

| 2009/0119275 | A1* | 5/2009 | Chen et al. ................. 707/5 |
| 2011/0035383 | A1* | 2/2011 | Ghimire .................... 707/748 |
| 2011/0179009 | A1* | 7/2011 | Nam ......................... 707/708 |
| 2011/0302162 | A1* | 12/2011 | Xiao et al. ................ 707/724 |
| 2011/0302172 | A1* | 12/2011 | Chandrasekar et al. ... 707/748 |

* cited by examiner

*Primary Examiner* — Etienne Leroux

(57) ABSTRACT

A method, non-transitory computer readable medium, and apparatus for extracting text from a social media document are disclosed. For example, the method indexes a plurality of social media documents into a plurality of snippets, receives a query including one or more keywords and a purpose, identifies one or more of the plurality of snippets that include the one or more keywords in an index, ranks the one or more of the plurality of snippets in accordance with the purpose and provides the one or more plurality of snippets that are ranked in accordance with the purpose.

8 Claims, 3 Drawing Sheets

METHOD AND APPARATUS FOR EXTRACTING PORTIONS OF TEXT FROM LONG SOCIAL MEDIA DOCUMENTS

The present disclosure relates generally to efficiently extracting relevant portions of text from documents and, more particularly, to a method and an apparatus for extracting portions of text from long social media documents.

BACKGROUND

Various social media platforms are sources of valuable data containing social conversations and public expressions/opinions about product and/or services in the public domain. This social data provides an opportunity to monitor public opinion about the product and/or service under consideration and utilize the monitoring results to effectively engage with consumers of the product and/or service under consideration.

Current solutions include a searching method that searches and analyzes all documents on the fly and searches for a match with a query. However, these searching methods are not efficient. Also, they are not sufficient for effective monitoring and analysis of social media documents due to the nature of social media documents. Social media documents are often unstructured, noisy, contain complex expressions of sentiments, are usually verbose and deal with multiple topics. Thus, only a small portion of the social media documents may be relevant, but the search algorithm may return the entire document.

SUMMARY

According to aspects illustrated herein, there are provided a method, a non-transitory computer readable medium, and an apparatus for extracting text from a social media document. One disclosed feature of the embodiments is a method that indexes a plurality of social media documents into a plurality of snippets, receives a query including one or more keywords and a purpose, identifies one or more of the plurality of snippets that include the one or more keywords in an index, ranks the one or more of the plurality of snippets in accordance with the purpose and provides the one or more plurality of snippets that are ranked in accordance with the purpose.

Another disclosed feature of the embodiments is a non-transitory computer-readable medium having stored thereon a plurality of instructions, the plurality of instructions including instructions which, when executed by a processor, cause the processor to perform operations that indexes a plurality of social media documents into a plurality of snippets, receives a query including one or more keywords and a purpose, identifies one or more of the plurality of snippets that include the one or more keywords in an index, ranks the one or more of the plurality of snippets in accordance with the purpose and provides the one or more plurality of snippets that are ranked in accordance with the purpose.

Another disclosed feature of the embodiments is an apparatus comprising a processor and a computer readable medium storing a plurality of instructions which, when executed by the processor, cause the processor to perform an operation that indexes a plurality of social media documents into a plurality of snippets, receives a query including one or more keywords and a purpose, identifies one or more of the plurality of snippets that include the one or more keywords in an index, ranks the one or more of the plurality of snippets in accordance with the purpose and provides the one or more plurality of snippets that are ranked in accordance with the purpose.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for extracting text from a social media document. As discussed above, various social media platforms are sources of valuable data containing social conversations and public expressions/opinions about product and/or services in the public domain. This social data provides an opportunity to monitor public opinion about the product and/or service under consideration and utilize the monitoring results to effectively engage with consumers of the product and/or service under consideration.

Current solutions include a searching method that searches and analyzes all documents on the fly and searches for a match with a query. However, these searching methods are not efficient. Also they are not sufficient for effective monitoring and analysis of social media documents due to the nature of social media documents. Social media documents are often unstructured, noisy, contain complex expressions of sentiments, are usually verbose and deal with multiple topics. Thus, only a small portion of the social media documents may be relevant, but the search algorithm may return the entire document.

One embodiment of the present disclosure provides a more efficient solution to extracting valuable information from long social media documents. In one embodiment, the long social media documents are indexed offline before the query is received such that a simple matching or information retrieval function is performed rather than performing a complex analysis of each document on the fly and performing a time consuming search function.

Figure 1:
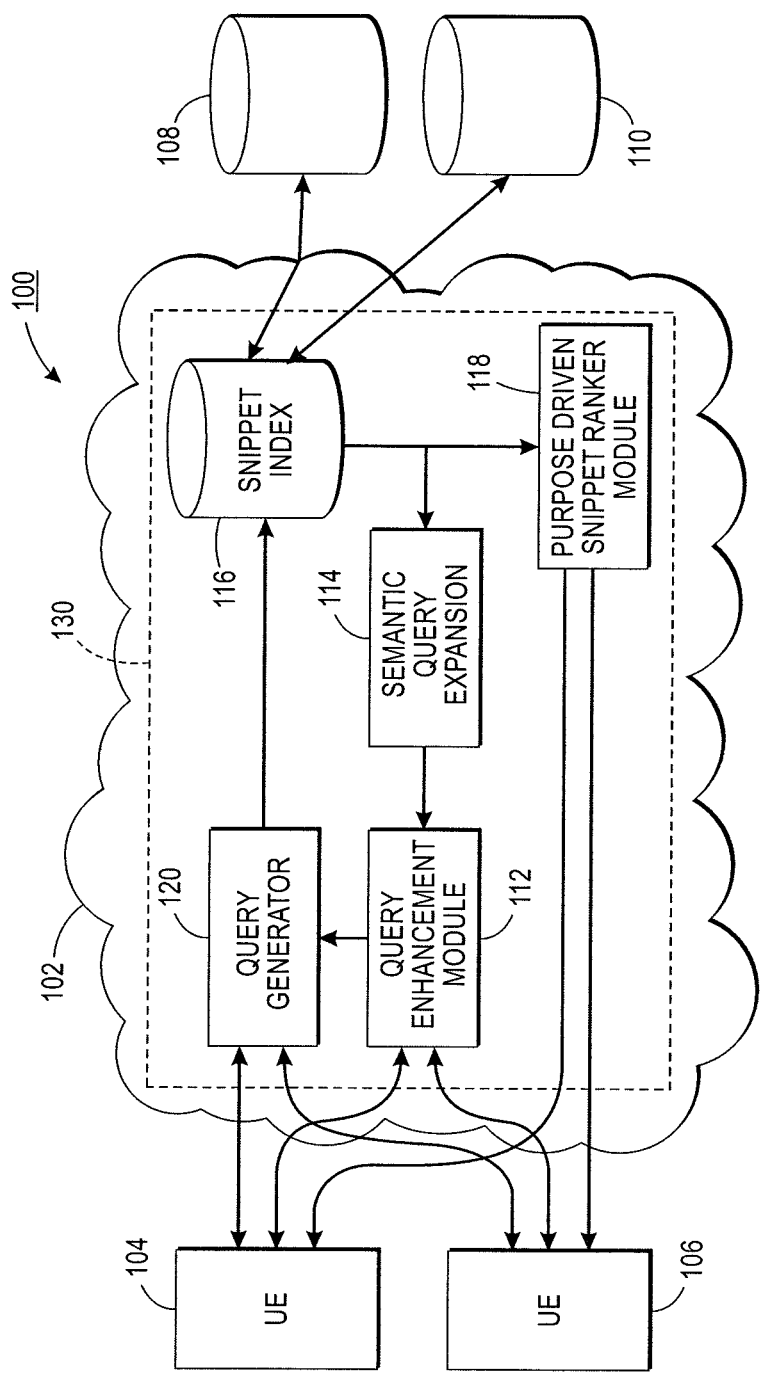
FIG. 1 illustrates an example communication network of the present disclosure.

To better understand the present disclosure, FIG. 1 illustrates an example of a communication network 100 for extracting portions of text from social media documents. In one embodiment, the communication network 100 may include an Internet Protocol (IP) network 102 in communication with one or more user endpoint (UE) devices 104 and 106 and one or more social media document storage databases 108 and 110. The IP network 102 may be, for example, a cellular communication network, the Internet, a service provider network, an access network, a core network, and the like.

In one embodiment, the UE devices 104 and 106 may be any type of endpoint device capable of communicating with the IP network 102. For example, the UE devices 104 and 106 may be a desktop computer, a laptop computer, a smartphone, a netbook computer, a desktop computer with calling capability, a tablet computer, and the like. It should be noted that although two endpoints are illustrated in FIG. 1, any number of endpoint devices (e.g., more or less) may be deployed.

In one embodiment, the one or more social media document storage databases 108 and 110 may be databases of social media companies that store all of the messages posted by subscribers. For example, the messages may comprise long social media documents (e.g., posts on a social media website, blogs, and the like). In one embodiment, "long" may be defined as being social media documents that include a plurality of sentences. For example a single sentence "tweet" from a social media website such as Twitter® would not be considered a "long" social media document.

In one embodiment, the IP network 102 may include social media document text extractor 130. In one embodiment, the social media document text extractor 130 may be made up of various modules that may be part of a single machine or deployed as separate machines located together or located in different locations.

In one embodiment, the social media document text extractor 130 may include a query generator 120, a query enhancement module 112, a semantic query expansion module 114, a snippet index 116 and a purpose driven snippet ranker module 118. In one embodiment, the query generator 120, the query enhancement module 112, the semantic query expansion module 114, the snippet index 116 and the purpose driven snippet ranker module 118 may be deployed as separate hardware with separate processors and memory at a same location or at different locations or may be deployed as part of a single application server. In one embodiment, the query generator 120, the query enhancement module 112, the semantic query expansion module 114, the snippet index 116 and the purpose driven snippet ranker module 118 may be located at a service provider location that is providing the extracting service.

In one embodiment, the snippet index 116 stores all of the snippets that are indexed from the long social media documents obtained from the one or more social media databases 108 and 110. In one embodiment, the indexing is performed offline before any query is received from a UE device 104 or 106. For example, long social media documents may be indexed by taking snippets of a pre-defined consecutive number of sentences N. The value of N must be greater than 1. In addition, the value of N is a balance between providing more context versus having more data that is potentially irrelevant. For example, the sentences before and after a particular sentence may provide a better context of how various words within the particular sentence are being used such that a false positive is not returned during a query. The more sentences that are analyzed before and after the particular sentence the better the context. However, there is a trade off of processing time and storage of irrelevant data.

In one embodiment, the value of N may be equal to 3. For example, each snippet may contain 3 sentences (e.g., a sentence before and a sentence after of a particular sentence).

In one embodiment, each snippet of a social media document is considered as a separate document within the snippet index. In other words, if 10 social media documents are indexed to have 10 snippets each, then there would be a total of 100 snippets that are each considered a separate document in the snippet index 116.

To illustrate by example, consider a full text of a long social media document example (1): "I was at Salvation Army today buying some books for the less fortunate.; While my phone was on the shelf yet within hand reach someone took my phone.; As I've been trying to call and text it from Dan's phone saying "I will give a reward," we're on the phone with Verizon text support due to FCC regulations I cannot find out recent activity.; Since the GPS can only be accessed via emergency, I asked to call the Pt.; Chester police so then the police could call and locate the GPS, no dice.; Verizon sucks.; Because even though you can suspend my phone that thief can still get into my email on any Wi-Fi area.; Thank you Verizon Wireless for making me vulnerable to my s.s.; my credit cards, my life.; Please tell your tech support to stop repeating "the lock code.; Do tell them that a lock code doesn't matter when the phone is taken before the lock code time is up.; Protect the criminal, not the customer.; Verizon sucks!; AND as for the thief who took my phone?; I hope you freeze to death tonight while being locked in A SMALL space with cuts on your body while alcohol drips on your wounds you piece of garbage.; Judge me for speaking the truth." In the long social media document example (1) if N=3 for each snippet, some example snippets may be: snippet (1) "Chester police so then the police could call and locate the GPS, no dice.; Verizon sucks.; Because even though you can suspend my phone that thief can still get into my email on any Wi-Fi area.", snippet (2) "Because even though you can suspend my phone that thief can still get into my email on any Wi-Fi area.; Thank you Verizon Wireless for making me vulnerable to my s.s.; my credit cards, my life", snippet (3) "Thank you Verizon Wireless for making me vulnerable to my s.s.; my credit cards, my life.; Please tell your tech support to stop repeating "the lock code," and so forth.

Using the long social media document example (1), the long social media document may be processed until all of the snippets are indexed. In one embodiment, each snippet may be indexed with keywords. For example, snippet (1) may be indexed with words "police, GPS, Verizon, sucks, Wi-Fi, phone", snippet (2) may be indexed with words "Verizon, sucks, Wi-Fi, phone, Verizon Wireless" and snippet (3) may be indexed with words "Verizon Wireless, tech support, lock code," and so forth. This process may be repeated for each snippet of each document that is indexed. As a result, when a query is received, the keywords in the query can be quickly matched with the indexed words of the snippets to extract the relevant snippets, as discussed in further detail below.

In one embodiment, the semantic query expansion module 114 may look for potential key words that are related to one or more keywords in a query from a user. For example, a customer may query for anything related to the term "Google® phone". However, many subscribers who post messages or blogs may refer to an "Android® phone". Thus, if a query is performed only on the query "Google® phone" many snippets that may be relevant to the query may be missed.

In one embodiment, the semantic query expansion module 114 may find related keywords by tracking a number of times a word appears near the keywords in the query. For example, the term "near" may be defined as being within the same sentence as the keyword. In one embodiment, if the word appears a number of times above a threshold (e.g., a pre-defined number of times or a predefined percentage), the word may be identified as a related keyword that should be provided to the user as a suggested keyword for query enhancement.

In another embodiment, the semantic query expansion module 114 may find related keywords according to a semantic scoring function. In one embodiment, words that have a semantic score above a threshold may be identified as a related keyword that may be suggested to a user for query enhancement.

In one embodiment the semantic scoring function of words "w" and keyword "k" may be defined as:

$$\text{SEMANTIC SCORE}(w, k) = \sum_{\forall d \in D} \sum_{\forall s \in S_d} freq(w, \text{snippet}) * \text{weight}_1(w, \text{snippet}) * \text{weight}_2(w, \text{document}) \quad \text{Eq. (1)}$$

wherein D represents a corpus of documents, $S_d$ represents the plurality of snippets for a document d, wherein $\forall d \in D$ represents for each document d that is an element of the corpus of documents, $\forall s \in S_d$ represents for each snippet that is an element of the plurality of snippets for the document d.

In one embodiment, the weight$_1$ may be defined according to a first weight function:

$$\text{weight}_1(w, \text{snippet}) = e^{-(\text{\# of words in snippet} - \text{average\# of words in all snippets})} \quad \text{Eq. (2)}$$

The Equation (2) may account for spam documents where the snippets are very long due to a large number of keywords in one sentence. Spam documents may contain a large number of terms or words and do not follow a well-defined grammatical structure. They usually consist of very long sentences consisting of multiple keywords. The words co-occurring with the keywords from the query may be given a lower weight.

In one embodiment, the weight$_2$ may be defined according to a second weight function:

$$\text{weight}_2(w, \text{document}) = e^{-(\text{\# of sentences in document} - \text{average\# of sentences in all documents})} \quad \text{Eq. (3)}$$

The Equation (3) may account for documents that are not spam but are still very long as they do not necessarily focus on one topic. Documents where a user is describing his or her experiences with a service and/or product are well focused and talk about the service and/or product. Such documents are generally short and concise. On the other hand, documents that describe general experiences of the user and talk about multiple topics are usually lengthier. Thus, Equation (3) assigns a higher weight to words coming from short, concise documents.

In one embodiment, once the related keywords are identified by the semantic query expansion module 114, the related keywords may be provided to the query enhancement module 112. In one embodiment, the query enhancement module 112 may provide the related keywords that are identified to a user. In one embodiment, the top K related keywords may be provided to the user. For example, the top 20 related keywords out of 100 may be provided to the user or only those related keywords having a semantic score above 50, for example, may be provided to the user.

In one embodiment, the query enhancement module 112 may provide the user an option to modify the initial query with the one or more related keywords. In one embodiment, the user may select all of the related keywords or may be allowed to select a subset of the related keywords (e.g., any number from one to less than the total number of related keywords).

In one embodiment, the query generator 120 may generate a query using one or more keywords received from a user via the UE devices 104 or 106 and/or one or more related keywords selected by the user from the query enhancement module 112. In one embodiment, the query generator 120 may then perform a query on the snippet index 116 to find one or more snippets 116 that match one or more keywords of the query.

In one embodiment, rather than requiring an exact match a relevancy function may be applied. In one embodiment, the relevancy function may be a function of the keywords and the snippets in the snippet index 116. A general relevancy function may be applied for a corpus of D documents $\{d_1, d_2, \ldots d_3\}$ and a set of keywords K=$\{K_1, K_2, \ldots, K_m\}$, where each $K_i = \{k_{i1}, k_{i2}, k_{im\text{-}sub\text{-}i}\}$ is a set of terms. $K_i$ represents a set of keywords of type i. This allows the general relevance function to account for different types of keywords, such as for example, original user provided keywords, keywords generated from outside sources, keywords indicating sentiments, and the like. Given D and K as input, snippets may be extracted from text of documents in the corpus of document D such that they are related to the keywords K. In one embodiment, each document $d_i$ may be split up into a number of snippets $S_{ij}$ and the snippets may be indexed as described above. Given the above scenario, a general relevancy function may be defined as:

$$\text{RELEVANCE}(s,K) = f(sim(s,K_1), sim(s,K_2), \ldots, sim(s,K_m)), \quad \text{Eq. (4)}$$

where sim represents a similarity function (s, $K_m$) of snippets (s) and keywords (K), such as for example, a cosine similarity function, term frequency-inverse document frequency (TF-IDF), Okapi BM25, language model, and the like. The combining function f may be defined based on user requirements and applications at hand.

In one embodiment, if one or more related keywords are used (e.g., selected by the user from the query enhancement module 112 or a different source) a weight relevancy function may be used for keywords $K_1$ obtained from the user in the initial query and secondary keywords $K_2$, wherein the keywords $K_1$ and the secondary keywords $K_2$ are semantically similar keywords. The weight relevancy function may be defined as:

$$\text{RELEVANCE}(s,K) = \text{weight}_1 * sim(s,K_1) + \text{weight}_2 * sim(s,K_2). \quad \text{Eq. (5)}$$

In one embodiment, the weight$_1$ and weight$_2$ may be arbitrarily set depending on a user preference. For example, the weight$_1$ and weight$_2$ may have equal weights of 0.5 each or the keywords $K_1$ may have a higher weight than the keywords $K_2$ (e.g., weight$_1$=0.7 and weight$_2$=0.3). The sim function may be any similarity function similar to those mentioned for Equation (4) discussed above.

In one embodiment, after the query is performed to obtain one or more snippets that match the query from the snippet index 116, the purpose driven snippet ranker module 118 may rank the snippets in an order according to a purpose received with the query. In one embodiment, the purpose may be a positive sentiment ranking, a negative sentiment ranking or a relevance ranking. For example, a customer may submit a query for all negative sentiment snippets about "Verizon Wireless® service". Thus, all of the snippets that match the query for "Verizon Wireless® service" would be ranked in order of most negative to least negative.

In one embodiment, if the purpose is relevance ranking any similarity based ranking scheme (e.g., TF-IDF, cosine similarity, Okapi BM25, language models, and the like) can be used. In one embodiment, if the purpose is positive sentiment or negative sentiment any sentiment ranking algorithm can be used using the sentiment cues present in the snippets.

It should be noted that the communication network 100 has been simplified. For example, the communication network 100 may include other network elements (not shown) such as border elements, routers, switches, policy servers, security devices, firewalls, a content distribution network (CDN), and the like. In addition, the communication network 100 may include additional networks (not shown) between the IP network 102, the mobile endpoint devices 104 and 106 and the one or more social media document storage databases 108 and 110, such as different access networks.

Figure 2:
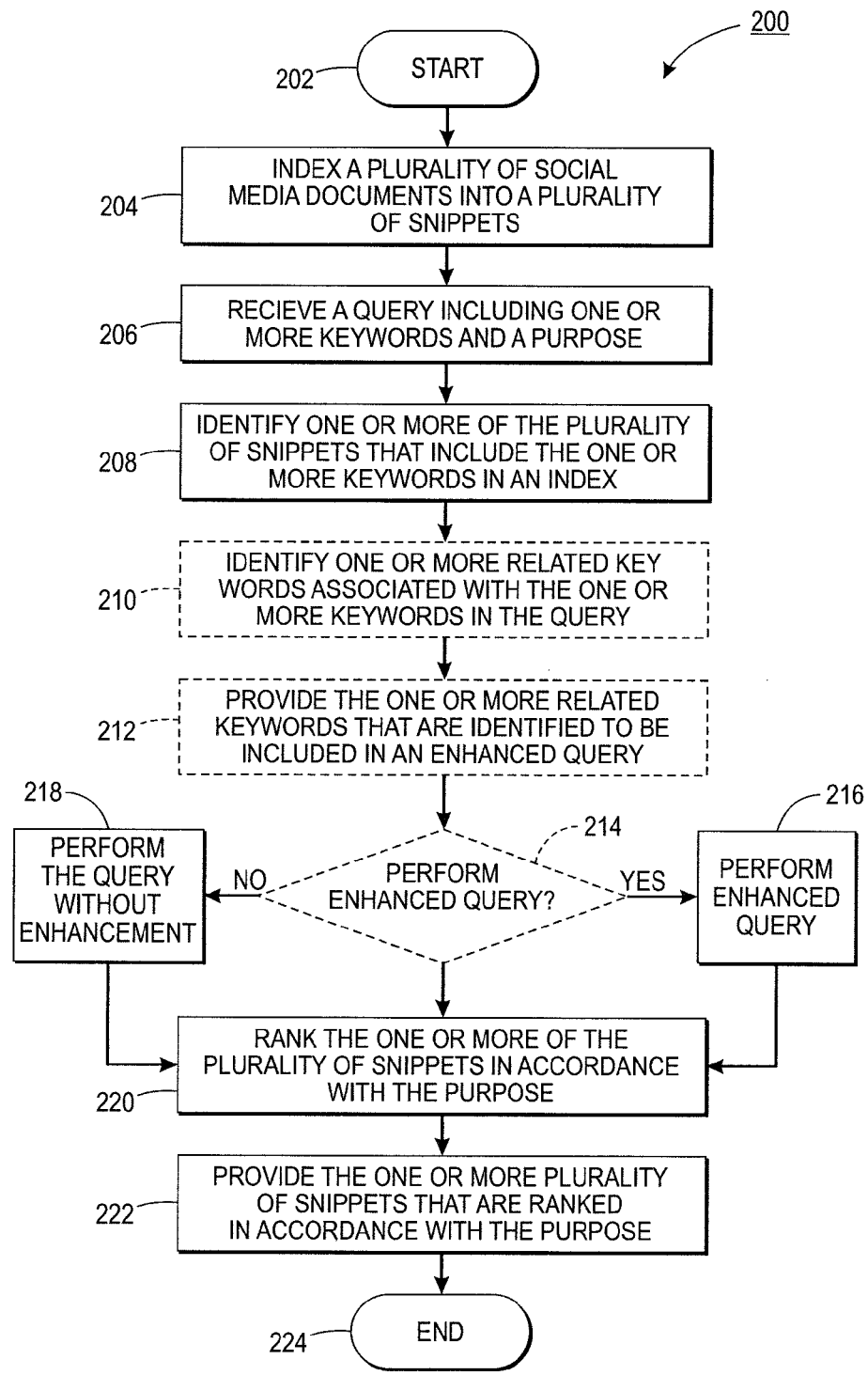
FIG. 2 illustrates an example flowchart of a method for extracting text from a social media document.
Figure 3:
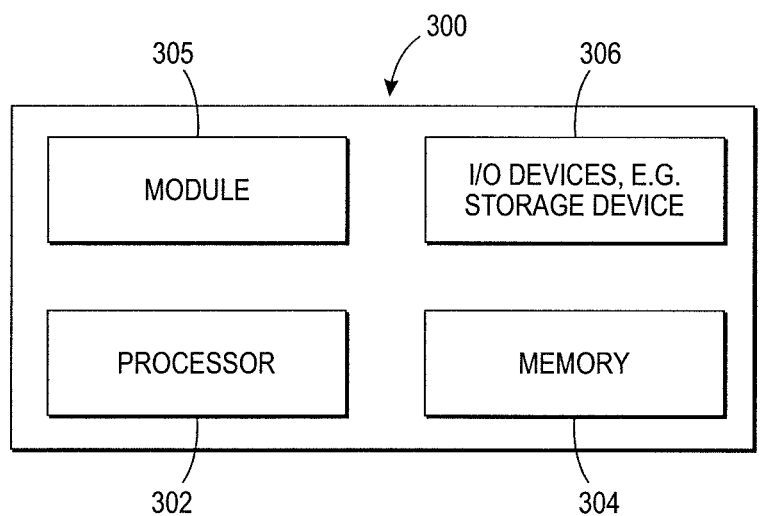
FIG. 3 illustrates a high-level block diagram of a general-purpose computer suitable for use in performing the functions described herein.

FIG. 2 illustrates a flowchart of a method 200 for extracting text from a social media document. In one embodiment, one or more steps or operations of the method 200 may be performed by the social media document text extractor 130 or a general-purpose computer as illustrated in FIG. 3 and discussed below.

The method 200 begins at step 202. At step 204, the method 200 indexes a plurality of social media documents into a plurality of snippets. In one embodiment, the indexing is performed offline before any query is received.

In one embodiment, the plurality of social media documents may be long social media documents. For example, long may be defined as social media documents that are greater than one sentence. For example, the long social media documents may be posts or messages posted on a social media website such as Facebook®, MySpace®, and the like or a personal blog.

In one embodiment, a snippet may be considered as a sub-document of the social media document. For example, if ten snippets are indexed from the social media document, the ten snippets may be treated as ten separate documents with respect to results for a query that is performed.

In one embodiment, a snippet may comprise N number of consecutive sentences from the social media document, where N is a number greater than 1. The value of N is a balance between providing more context versus having more data that is potentially irrelevant. For example, the sentences before and after a particular sentence may provide better context of how various words within the particular sentence are being used such that a false positive is not returned during a query. The more sentences that are analyzed before and after the particular sentence the better the context. However, there is a trade off of processing time and storage of irrelevant data.

In one embodiment, the value of N may be equal to 3. For example, each snippet may contain 3 sentences (e.g., a sentence before and a sentence after of a particular sentence).

At step 206, the method 200 receives a query including one or more keywords and a purpose. For example, a customer using a user endpoint device may submit a query for particular keywords that are associated with the his or her service and/or product. In one embodiment, the purpose may define what the customer is looking for with respect to the keywords in the query. For example, the customer may be looking for snippets that have a positive sentiment or a negative sentiment. Alternatively, the customer may simply be looking for all snippets based upon a relevance ranking regardless of the associated sentiment.

At step 208, the method 200 identifies one or more of the plurality of snippets that include the one or more keywords in an index. For example, the index may be the result of the indexing that was performed in step 204. In one embodiment, the one or more snippets may be used by applying a relevance function, for example Equations (4) or (5), described above.

At optional step 210, the method 200 may identify one or more related keywords associated with the one or more keywords in the query. For example, a customer may query for anything related to the term "Google® phone". However, many subscribers who post messages or blogs may refer to an "Android® phone". Thus, if a query is performed only on the query "Google® phone" many snippets that may be relevant to the query may be missed.

In one embodiment, the related keywords may be found by tracking a number of times a word appears near the keywords in the query. For example, near may be defined as being within the same sentence as the keyword. In one embodiment, if the word appears a number of times above a threshold (e.g., a predefined number of times or a predefined percentage), the word may be identified as a related keyword that should be provided to the user as a suggested keyword for query enhancement. In another embodiment, the related keywords may be found according to a semantic scoring function described by Equation (1) above. In one embodiment, words that have a semantic score above a threshold may be identified as a related keyword that may be suggested to a user for query enhancement.

At optional step 212, the method 200 may provide the one or more related keywords that are identified to be included in an enhanced query. For example, the customer or user may have an option to accept all the related keywords for the enhanced query, select any number less than all of the related keywords for the enhanced query or select none of the related keywords and continue with the initial query submitted by the customer.

At option step 214, the method 200 determines if an enhanced query should be performed. If the customer does not select any of the related keywords that are identified, then the method 200 does not perform the enhanced query. Rather, the method 200 proceeds to step 218 and performs the query without enhancement (e.g., the initial query received from the customer).

However, if at optional step 214, the customer selects at least one of the related keywords that are identified, the method 200 proceeds to step 216 and performs the enhanced query that includes the one or more keywords from the customer's initial query and the at least one related keyword that is selected. At either step 216 or 218, the query is performed and one or more snippets are identified that match the query.

At step 220, the method 200 ranks the one or more of the plurality of snippets in accordance with the purpose. In one embodiment, if the purpose is relevance ranking any similarity based ranking scheme (e.g., TF-IDF, cosine similarity, Okapi BM25, language models, and the like) can be used. In one embodiment, if the purpose is positive sentiment or negative sentiment any sentiment ranking algorithm can be used using the sentiment cues present in the snippets.

At step 222, the method 200 provides the one or more plurality of snippets that are ranked in accordance with the purpose. For example, the one or more plurality of snippets that are ranked may be displayed on a display of the user endpoint device of the customer or user. In another embodiment, the one or more plurality of snippets that are ranked may be provided via an email, text message, posted on a website or any other form of communication. At step 224, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for extracting text from a social media document, and various input/output devices 306 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 305 for extracting text from a social media document can be loaded into memory 304 and executed by processor 302 to implement the functions as discussed above. As such, the present method 305 for extracting text from a social media document (including associated data structures) of the present disclosure can be stored on a non-transitory (e.g., physical and tangible) computer readable storage medium, e.g., RAM memory, magnetic or optical drive or diskette and the like. For example, the hardware processor 302 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for extracting text from a social media document, comprising:
   indexing, by a processor, a plurality of social media documents into a plurality of snippets;
   receiving, by the processor, a query including one or more keywords and a purpose;
   identifying, by the processor, one or more of the plurality of snippets that include the one or more keywords in an index;
   ranking, by the processor, the one or more of the plurality of snippets in accordance with the purpose;
   providing, by the processor, the one or more plurality of snippets that are ranked in accordance with the purpose; and
   performing, by the processor, a query enhancement on the query, wherein the query enhancement comprises:
      identifying one or more related keywords associated with the one or more keywords in the query, wherein the one or more related keywords comprise any term that has a semantic score above a threshold, wherein the semantic score is calculated according to an equation:

$$\text{SEMANTIC SCORE}(w, k) = \sum_{\forall d \in D} \sum_{\forall s \in S_d} freq(w, \text{snippet}) * \text{weight}_1(w, \text{snippet}) * \text{weight}_2(w, \text{document})$$

wherein D represents a corpus of documents $S_d$ represents the plurality of snippets for a document d, wherein $\forall d \in D$ represents for each document d that is an element of the corpus of documents, $\forall s \in S_d$ represents for each snippet that is an element of the plurality of snippets for the document d, $\text{weight}_1$ is defined according to a first weight function:

$$\text{weight}_1(w, \text{snippet}) = e^{-(\text{\# of words in snippet} - \text{average \# of words in all snippets})}$$

and $\text{weight}_2$ is defined according to a second weight function:

$$\text{weight}_2(w, \text{document}) = e^{-(\text{\# of sentences in document} - \text{average \# of sentences in all documents})};$$

and
   providing the one or more related keywords that are identified to be included in an enhanced query.

2. The method of claim 1, wherein each one of the plurality of snippets comprises a pre-defined number of consecutive sentences.

3. The method of claim 2, wherein the pre-defined number of consecutive sentences equals three.

4. The method of claim 1, wherein the purpose comprises at least one of: a positive sentiment ranking, a negative sentiment ranking or a relevance ranking.

5. A non-transitory computer-readable medium storing a plurality of instructions which, when executed by a processor, cause the processor to perform operations for extracting text from a social media document, the operations comprising:
   indexing a plurality of social media documents into a plurality of snippets;
   receiving a query including one or more keywords and a purpose;
   identifying one or more of the plurality of snippets that include the one or more keywords in an index;
   ranking the one or more of the plurality of snippets in accordance with the purpose;
   providing the one or more plurality of snippets that are ranked in accordance with the purpose; and
   performing a query enhancement on the query, wherein the query enhancement comprises:
      identifying one or more related keywords associated with the one or more keywords in the query, wherein the one or more related keywords comprise any term that has a semantic score above a threshold, wherein the semantic score is calculated according to an equation:

$$\text{SEMANTIC SCORE}(w, k) = \sum_{\forall d \in D} \sum_{\forall s \in S_d} freq(w, \text{snippet}) * \text{weight}_1(w, \text{snippet}) * \text{weight}_2(w, \text{document})$$

wherein D represents a corpus of documents $S_d$ represents the plurality of snippets for a document d, wherein $\forall d \in D$ represents for each document d that is an element of the corpus of documents, $\forall s \in S_d$ represents for each snippet that is an element of the plurality of snippets for the document d, $weight_1$ is defined according to a first weight function:

$$weight_1(w, snippet) = e^{-(\text{\# of words in snippet} - \text{average \# of words in all snippets})}$$

and $weight_2$ is defined according to a second weight function:

$$weight_2(w, document) = e^{-(\text{\# of sentences in document} - \text{average \# of sentences in all documents})};$$

and providing the one or more related keywords that are identified to be included in an enhanced query.

6. The non-transitory computer-readable medium of claim 5, wherein each one of the plurality of snippets comprises a pre-defined number of consecutive sentences.

7. The non-transitory computer-readable medium of claim 6, wherein the pre-defined number of consecutive sentences equals three.

8. The non-transitory computer-readable medium of claim 5, wherein the purpose comprises at least one of: a positive sentiment ranking, a negative sentiment ranking or a relevance ranking.

* * * * *